United States Patent [19]

Muse

[11] 4,300,444
[45] Nov. 17, 1981

[54] COOKER SUPPORT SYSTEM

[75] Inventor: Edward T. Muse, Tolosa, Tex.

[73] Assignee: Smoker Products, Inc., Mabank, Tex.

[21] Appl. No.: 11,938

[22] Filed: Feb. 13, 1979

[51] Int. Cl.³ .................................................. A47J 37/04
[52] U.S. Cl. .................................................. 99/448; 99/482
[58] Field of Search ................. 99/448, 339, 417, 447, 99/449–450, 467, 482–483; 108/149; 211/119, 71, 113; 248/318, 330, 352, 375, 410, 417; 220/19; 126/25 R

[56] References Cited

U.S. PATENT DOCUMENTS

| | | | |
|---|---|---|---|
| 225,020 | 3/1880 | Pettengill | 248/318 |
| 476,790 | 6/1892 | Frost | 220/19 X |
| 519,580 | 5/1894 | Kelsey | 99/448 |
| 520,846 | 6/1894 | Foland | 99/448 |
| 932,943 | 8/1909 | Bagula | 99/449 |
| 1,104,096 | 7/1914 | Beatty et al. | 220/19 |
| 1,271,326 | 7/1918 | Kivlan | 99/449 |
| 2,641,246 | 6/1953 | Guthof | 99/447 X |
| 2,652,768 | 9/1953 | Moreno | 99/448 X |
| 3,299,800 | 1/1967 | Angelo | 99/417 |
| 3,333,526 | 8/1967 | Kirkpatrick | 99/482 X |
| 3,447,530 | 6/1969 | Santeramo | 126/25 R |
| 3,776,127 | 12/1973 | Muse | 99/482 |
| 4,084,779 | 4/1978 | Moineau | 211/119 X |

FOREIGN PATENT DOCUMENTS

| | | | |
|---|---|---|---|
| 543243 | 2/1942 | United Kingdom | 99/450 |
| 563024 | 7/1944 | United Kingdom | 99/448 |

*Primary Examiner*—Harvey C. Hornsby
*Assistant Examiner*—Arthur O. Henderson
*Attorney, Agent, or Firm*—Richards, Harris & Medlock

[57] ABSTRACT

A cooking device (10) having a cylindrical housing (14), with a removable domed top closure (11), and supported by legs (12) radially spaced around the body is provided. The apparatus has a heat source (13) located near the bottom of the housing (14) and resting on top of the supporting legs (12). The water pan (22) is located above the heat source (13) and one or more grills (20 and 21) are located above the water pan (22). The grills (20 and 21) and the water pan (22) are supported by hanger structures (23) which engage the water pan (22) and have integral loops (39 and 40) forming planes of support for the grills (20 and 21).

4 Claims, 7 Drawing Figures

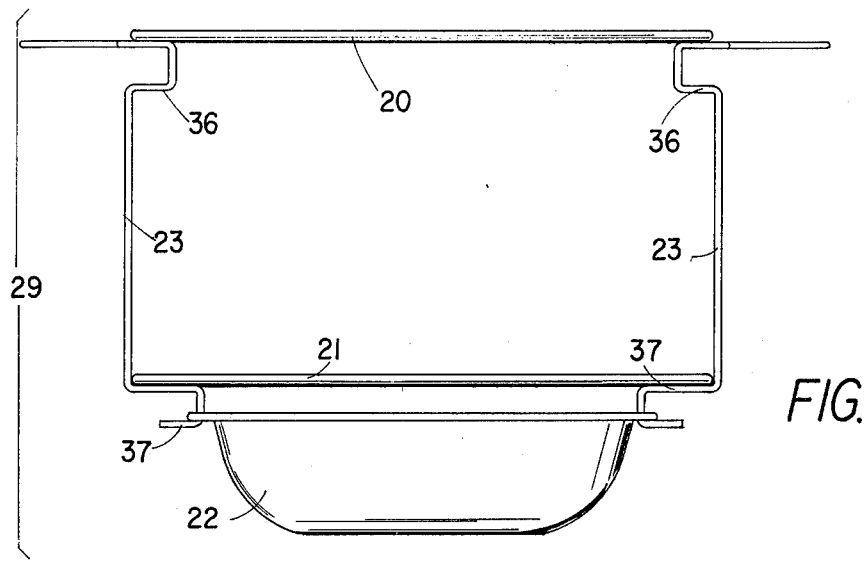
FIG. 3
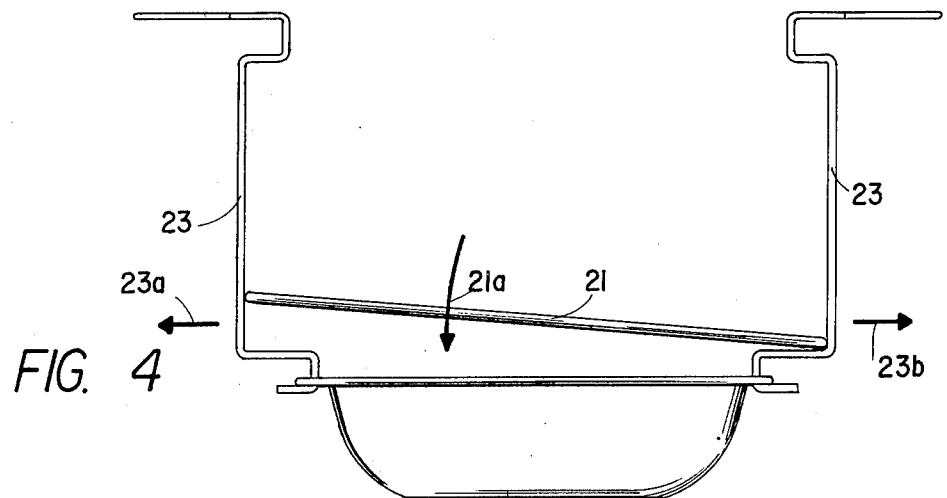
FIG. 4
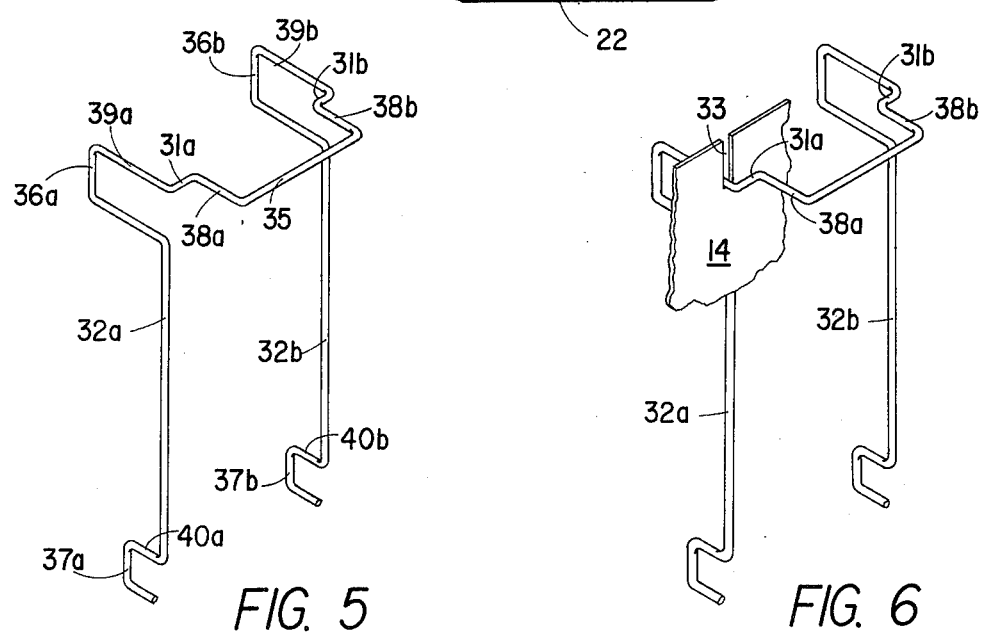
FIG. 5
FIG. 6

COOKER SUPPORT SYSTEM

TECHNICAL FIELD

The present invention relates to a cooking device, and more particularly to a smoker used for cooking meats and other foods under moist atmospheric conditions.

BACKGROUND ART

Various cookers of smoker type can be found in prior art. The advantage of moist smoker cooking is that a desirable flavor is imparted to the food without the necessity of a complicated rotisserie or manual turning, since the method utilizes low or moderate heat to cook the food. Further, the juices from the meat are caught and vaporized to baste the meat to keep the meat moist and prevent dehydration. A water pan containing liquid is supported above the heat source to provide additional moisture during the cooking process. Once the meat has been placed in the cooker, the cooker can be left substantially unattended until the meat is completely done.

Cookers for the preparation of smoke-flavored meat generally include a cover housing containing a grill for supporting the meat during cooking. A pan is located beneath the grill and serves to catch the drippings and, if desired, a predetermined amount of water may be added to the pan to vaporize for added moisture during cooking. A heat source is located in the bottom of the housing beneath the water pan. To generate the flavor-imparting smoke, combustible materials such as wood chips, hickory or mesquite, are positioned near the heat source. A fuel such as charcoal is commonly used as a source of heat, but various new cookers have been designed to utilize an electrical resistance heating element to provide the heat necessary to accomplish cooking.

DISCLOSURE OF THE INVENTION

In smoker cookers of the type wherein a fuel pan, a water pan and grills are supported one above the other in an open-ended vertical housing, cooking grills and water pan have been supported by flanges welded to the inner walls of the cooker housing. U.S. Pat. No. 3,299,800 discloses such a smoker cooker. U.S. Pat. No. 2,221,098 discloses a smoker cooker in which the grills and heat source basket are supported by handles which extend along the inner walls of housing and engage the top of the housing.

The present invention employs a novel hanger structure which engages the top of the cooker housing and provides unique support for the grills and water pan.

BRIEF DESCRIPTION OF DRAWINGS

A more complete understanding of the invention and its advantages will become apparent from the following detailed description and drawings in which:

FIG. 3 is a detailed view of the detail structure removed from the housing;

FIG. 4 is a detailed view showing the bottom grill forced in place and the resultant clapping action;

FIG. 5 is a detailed view of the hanger structure;

FIG. 6 is a detailed view of the hanger structure engaged with a break-away portion of the housing.

DETAILED DESCRIPTION

Figure 1:
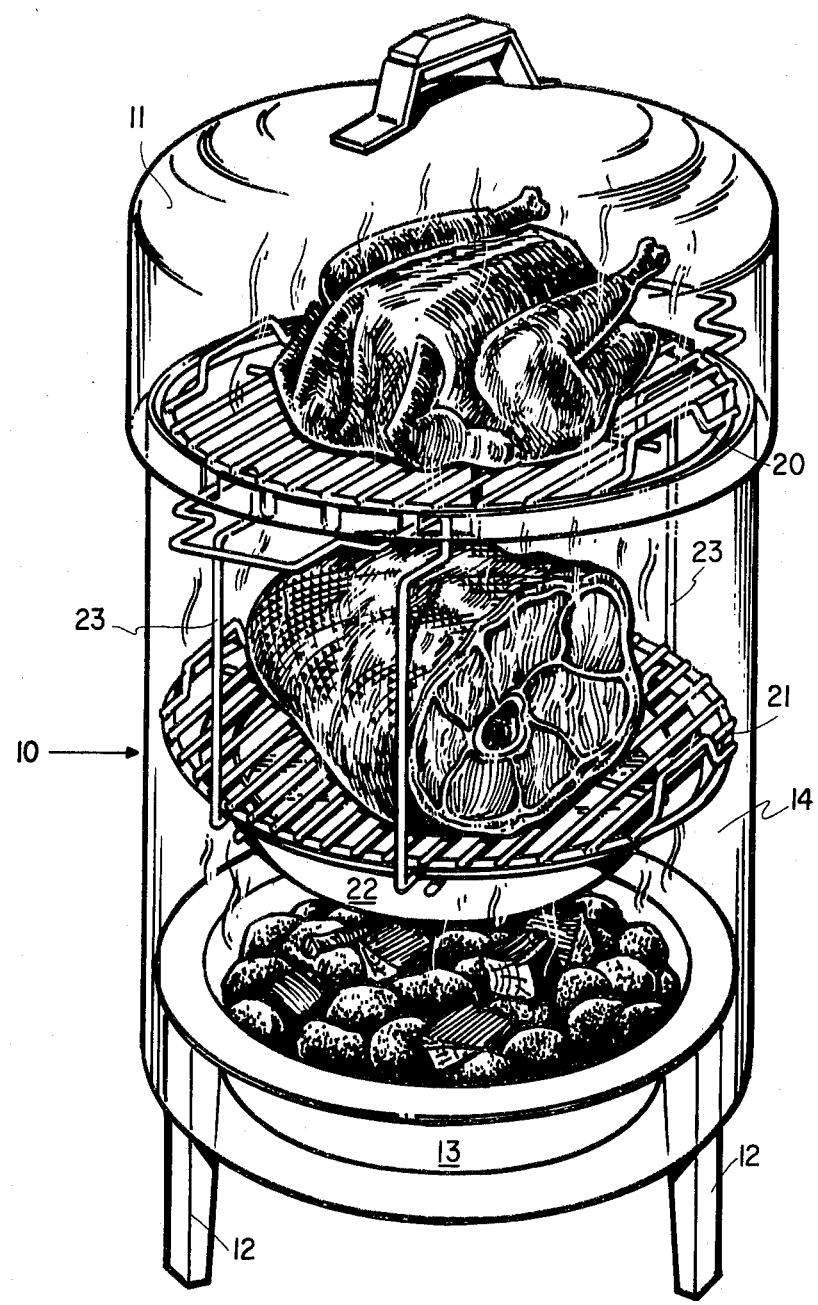
FIG. 1 is a phantom view of the preferred embodiment of the cooking apparatus of the present invention.
Figure 2:
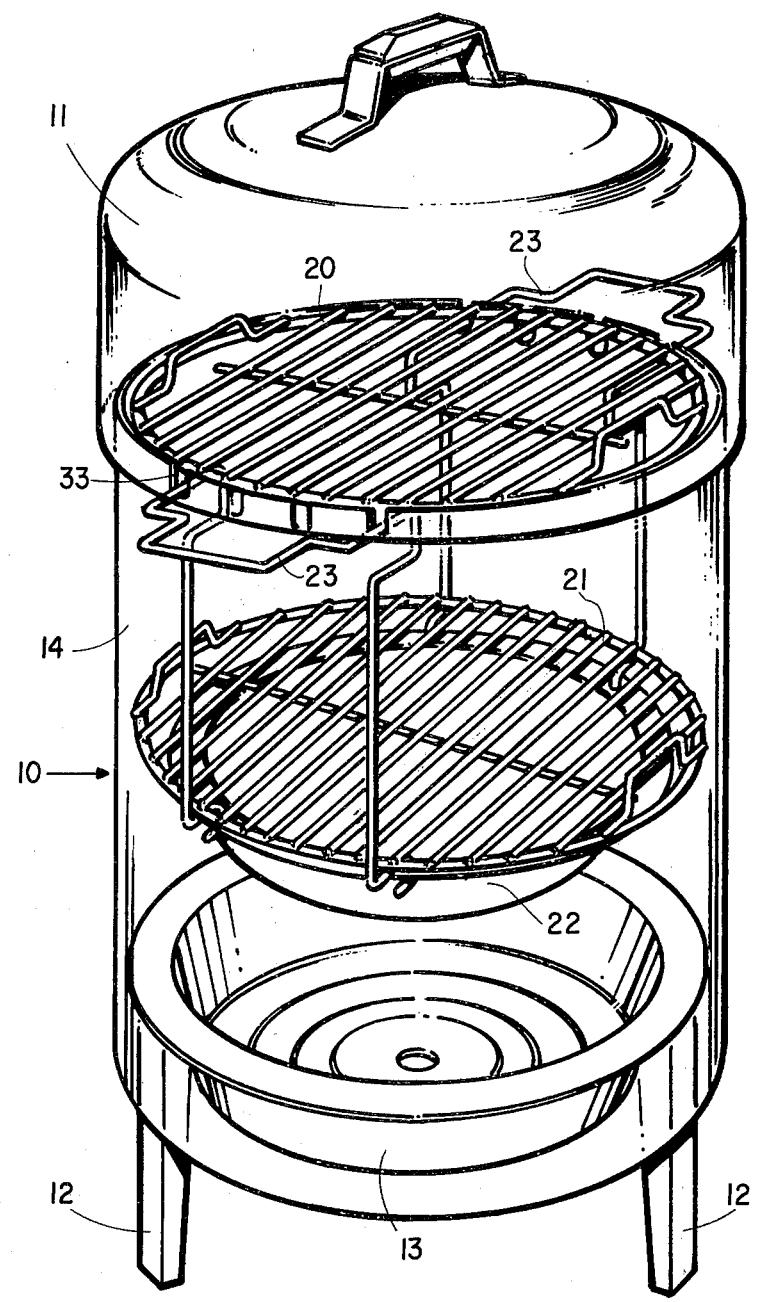
FIG. 2 is a phantom view showing the internal details of the cooker.

Now referring to the drawings, FIGS. 1, 2 and 3 in particular, the cooker of the present invention comprises a tubular housing 14 having a removable domed top closing 11 typically of about 15 inches in diameter. Housing 14 is supported by three legs 12 of vertical channels welded to the inner wall of housing 14. At the top of housing 14 are eight slots 33 divided into two sets of four, which are diametrically opposite. Slots 33 are approximately a quarter of an inch wide and extend from the top of housing 14 approximately three-quarters of an inch downward. Slots 33 are radially spaced approximately one and one-half inches from one another about the top of housing 14. A heat source 13, such as a charcoal pan, is located near the bottom of the housing 14 and is supported atop legs 12. Above heat source pan 13 is a water pan 22 which is supported and engaged by loops 37 in a hanger structure 23.

Located above water pan 22 are cooking grills 20 and 21 supported by a hanger structure 23. Grills 20 and 21 rest on top of hanger loops 36 and 37. The interior unit 29 is readily removable from housing 14.

As shown in FIG. 4, when grill 21 is forced downward as in the direction of arrow 21a, the hanger members 23 are forced outward in the direction indicated by arrows 23a and 23b. Hanger members 23 are forced against the interior walls of housing 14, thus making the interior unit 29 more stable.

FIGS. 5 and 6 illustrate an integral unitary hanger of preferred form. Hanger structure 23 comprises a handle 35 which is spaced from the wall of housing 14 by portions 38a and 38b. Horizontal courses 31a and 31b extend from portions 38a and 38b away from one another a distance such as to register with the outer slots 33 of housing 14. Upper loops 36a and 36b and lower loops 37a and 37b extend radially inward and form top portions 39a, 39b, 40a and 40b. Vertical courses 32a and 32b extend from upper loops 36a and 36b to lower loops 37a and 37b along the inner surface of housing 14. Vertical courses 32a and 32b are located slightly farther away from handle 35 than horizontal courses 31a and 31b. Because of this, horizontal courses 31a and 31b may contact the exterior surface of housing 14 while vertical courses 32a and 32b contact the interior surface of housing 14. Hanger structure 23 is supported in housing 14 at the bottom of slots 33 formed in the top of the housing wall. Outwardly directed hook portions on the lower loops 37a and 37b engage holes in the rim of pan 22 while the top portions of loops 37a and 37b serve as supports for the lower grill 21. When the hanger structures 23 are engaged with the housing 14 in this manner, they are stable and provide support means for grills 20 and 21 and water pan 22.

In use when foods are to be cooked on grills 20 and 21, the pan 13 is first placed in the bottom of the unit and filled with fuel which is ignited. Thereafter, the pan 22 is water filled and is secured to the lower ends of the hangers and is lowered into the cooker housing 14 until the handle portions nest in the slots in the upper edge of housing 14. Thereafter, the lower grill 21 is set in place, forcing the vertical courses 32a and 32b of the hangers 23 out into engagement with the wall of the housing 14. Food items can then be placed on the lower grill 21. The upper grill 20 is then set in place, resting on the upper surfaces 39a and 39b of the loops 36a and 36b in the hangers. Food items may then be placed on the upper grill 20, the lid may then be set in place and the food items thereafter slowly cooked.

Figure 7:
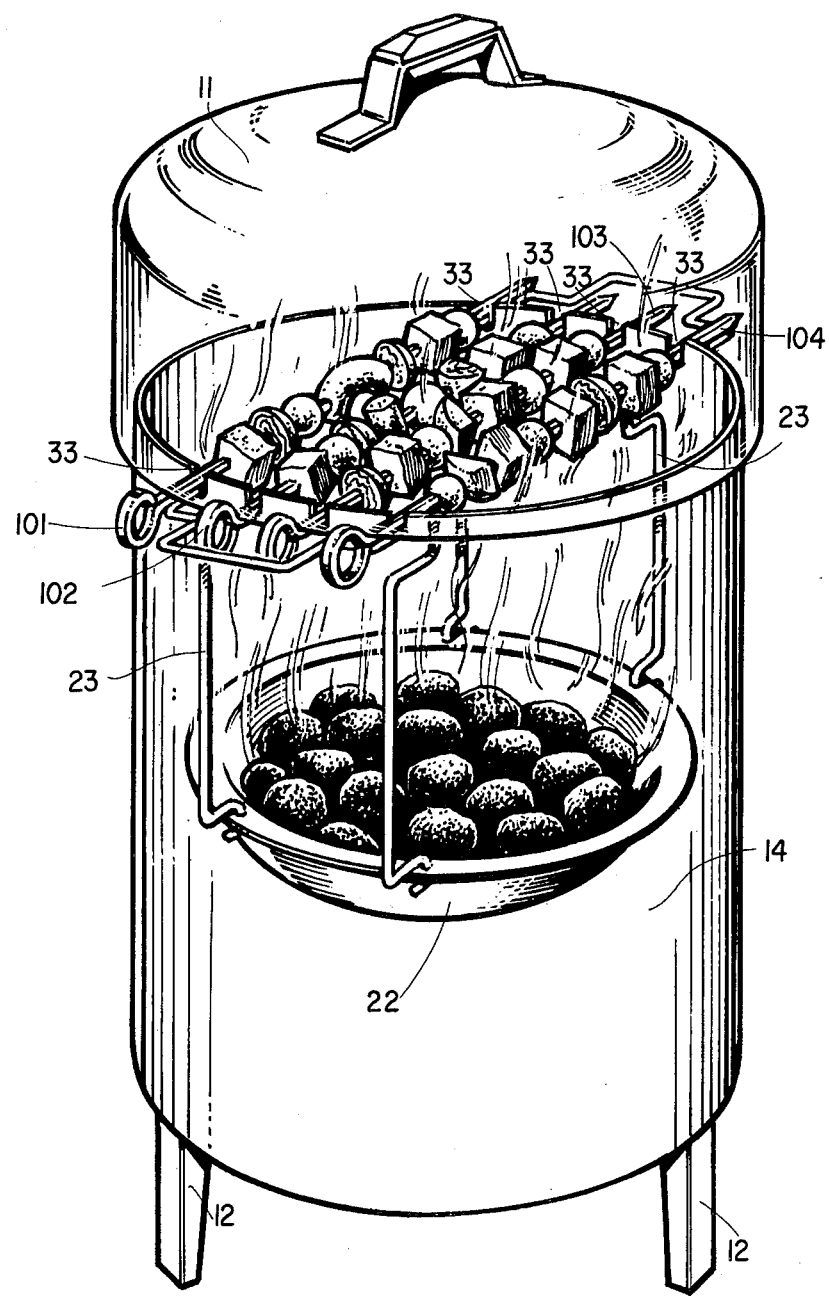
FIG. 7 is a phantom view illustrating use of the system for cooking food on skewers.

Alternatively, and as shown in FIG. 7, skewers 100, 101, 102, 103 may be supported in the slots 33 with the water pan 22 serving as a charcoal-containing pan to supply the cooking heat. Thus, hangers in the form above-described provide a cooker with substantially enhanced versatility over units of the prior art. By making the lower loops of the hanger structure with abrupt deviations in direction, once they engage the pan 22 and are rotated to a vertical position, pan 22 cannot become disconnected from the loops, thereby assuring stability of water containing pan 22 during cooking operations.

Modifications and changes to the present invention will occur to those skilled in the art, it being understood and intended that the present invention is to be limited only for interpretation of the intended claims.

I claim:

1. In a cooking device where a tubular housing has a heat source supported at the bottom and a pan and a grill to be supported thereabove, the improvement comprising in combination:

at least three hanger structures adapted to removeably rest in circumferentially spaced slots on a top rim portion of said housing and extend along the inner walls thereof with a portion contacting the outer face of the wall of said housing adjacent to one of said slots for limiting the inward movement of said hanger and a downwardly directed member for longitudinally contacting the inner wall of said housing below said one of said slots and terminating in a hook formed of a radial inwardly directed portion, a downwardly directed portion, a horizontal outwardly directed portion with said inwardly directed portion also forming an upward facing shoulder, said hook extending through apertures in the pan to engage and support the pan beneath the grill, said grill supported on said shoulder and providing positive locking of said hook against disengagement from said pan by forcing the downwardly directed portions of said hooks outward toward the housing wall, thereby preventing withdrawal of said hooks through said apertures when said downwardly directed members are in contact with said inner wall of said housing.

2. The cooking device of claim 1 wherein the diameter of said grill corresponds to the inside diameter of the tubular housing less twice the thickness of the vertical members of each said hanger structure, thus forcing said vertical members against the inner wall of said tubular housing and forcing the vertical members of the hooks against the outermost edge of the apertures in the pan, thereby securing the hangers, grill, and pan as a single non-removable unit.

3. In a cooking device where a tubular housing has a heat source supported at the bottom and a grill and pan to be supported thereabove, the improvement comprising:

a pair of opposed hangers depending from the top rim of said housing and extending vertically along the inner wall thereof, each hanger comprising a one piece integral wire member including a pair of circumferentially spaced rim support portions joined externally of said housing and extending inwardly of said housing across said rim, and a pair of circumferentially spaced grill support portions extending from said rim support portions vertically downward along the inner wall of said housing, said vertical grill support portions having a combined loop and outward facing hook at the bottom thereof comprising an inward loop portion for supporting a grill and a hook portion for passing through apertures in the pan to support the pan beneath the grill, said combined loop and hook providing a force fit support for the grill to force said vertical grill support portions of said hangers outward against said inner wall of said housing to provide a tight fit and also to positively lock said combined loop and hook against disengagement from the pan by forcing the vertical member of said hook and loop against the outside wall of the aperture in the pan thereby preventing withdrawal of said hook portions through said apertures when said grill support portions are in contact with the inner wall of said housing.

4. The invention according to claim 3 wherein said vertical grill support portions have a grill supporting loop at the top thereof with a top horizontal surface formed from a radial inward extension of the said rim support portion.

* * * * *